US007068609B2

(12) United States Patent
Huff

(10) Patent No.: US 7,068,609 B2
(45) Date of Patent: Jun. 27, 2006

(54) METHOD AND APPARATUS FOR PERFORMING WIRE SPEED AUTO-NEGOTIATION

(75) Inventor: Gary S. Huff, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 378 days.

(21) Appl. No.: 09/915,743

(22) Filed: Jul. 26, 2001

(65) Prior Publication Data

US 2002/0041571 A1 Apr. 11, 2002

Related U.S. Application Data

(60) Provisional application No. 60/224,055, filed on Aug. 9, 2000, provisional application No. 60/223,111, filed on Aug. 3, 2000.

(51) Int. Cl.
 *H04J 1/16* (2006.01)
(52) U.S. Cl. .................................. 370/252; 370/445
(58) Field of Classification Search ................ 370/244, 370/466, 389, 465, 396, 296, 252, 449, 248, 370/250; 709/230, 232, 233
See application file for complete search history.

(56) References Cited

U.S. PATENT DOCUMENTS

| 4,417,333 | A | * | 11/1983 | Cochennec | ................ | 370/359 |
|---|---|---|---|---|---|---|
| 5,208,812 | A | * | 5/1993 | Dudek et al. | ............... | 370/248 |
| 5,432,775 | A | * | 7/1995 | Crayford | ................ | 370/248 |
| 5,586,117 | A | * | 12/1996 | Edem et al. | ................ | 370/401 |
| 5,922,052 | A | | 7/1999 | Heaton | | |
| 5,938,731 | A | | 8/1999 | Schreiter | | |
| 5,953,340 | A | * | 9/1999 | Scott et al. | ................ | 370/401 |
| 5,991,303 | A | * | 11/1999 | Mills | ........................ | 370/402 |
| 6,067,585 | A | * | 5/2000 | Hoang | ........................ | 370/280 |
| 6,085,241 | A | | 7/2000 | Otis | | |

(Continued)

OTHER PUBLICATIONS

"Physical Layer link signaling for 10 Mb/s and 100 Mb/s Auto-Negotiation on twisted pair," Oct. 26, 1995, IEEE Std. 803.2u-1995, p. 241 and 344.*

(Continued)

*Primary Examiner*—Huy D. Vu
*Assistant Examiner*—Daniel Ryman
(74) *Attorney, Agent, or Firm*—Garlick, Harrison & Markison; Bruce Garlick

(57) ABSTRACT

Auto-negotiation with a communication partner includes downgrading a set of advertised communications capabilities, e.g., IEEE 802.3 capabilities, when a link with the communication partners fails to support an advertised communications capability, e.g., wire-speed. One operation includes: (1) advertising a first set of communications capabilities; (2) arriving at a first common set of communications capabilities based upon the first set of communications capabilities; (3) attempting to establish a link according to the first common set of communications capabilities; (4) failing to establish a link according to the first common set of communications capabilities; (5) downgrading the first set of communications capabilities to a second set of communications capabilities; (6) advertising the second set of communications capabilities; (6) arriving at a second common set of communications capabilities according to the second common set of communications capabilities; and (7) attempting to establish a link according to the second common set of communications capabilities.

20 Claims, 6 Drawing Sheets

U.S. PATENT DOCUMENTS

| | | |
|---|---|---|
| 6,115,389 A | 9/2000 | Mahale et al. |
| 6,198,727 B1 * | 3/2001 | Wakeley et al. ............ 370/247 |
| 6,215,816 B1 | 4/2001 | Gillespie et al. |
| 6,285,659 B1 * | 9/2001 | Feuerstraeter et al. ...... 370/244 |
| 6,603,741 B1 * | 8/2003 | Poulter et al. .............. 370/252 |
| 6,690,650 B1 * | 2/2004 | Stener ........................ 370/241 |
| 6,728,216 B1 * | 4/2004 | Sterner ....................... 370/252 |
| 2001/0038674 A1 | 11/2001 | Trans |

OTHER PUBLICATIONS

Advanced Micro Devices Am79C971 Preliminary Data Sheet for PCnet-FAST Single-Chip Full-Duplex 10/100 Mbps Ethernet Controller for PCI Local Bus (May 1996).

Advanced Micro Devices Am79C971 PCnet-FAST Hardware User's Manual (Jul. 1996).

Level One Data Sheet LXT970 Fast Ethernet Transceiver (May 1997).

* cited by examiner

METHOD AND APPARATUS FOR PERFORMING WIRE SPEED AUTO-NEGOTIATION

CROSS REFERENCE TO RELATED APPLICATIONS

This application claims priority to U.S. Provisional Application Ser. No. 60/223,111, filed Aug. 3, 2000 and to U.S. Provisional Application Ser. No. 60/224,055, filed Aug. 9, 2000, both of which are hereby incorporated by reference in their entirety.

FIELD OF THE INVENTION

The present invention relates generally to communications systems and particularly to Local Area Networking (LAN) communications systems.

BACKGROUND OF THE INVENTION

Network communications have developed quickly over the last two decades. With the explosion of the Internet there is also an explosion in the speed requirements to process applications across the Internet. Many applications now include real-time voice and video and therefore have significant bandwidth requirements. However, there is still a large installed base of legacy technology that communicates at slow speeds. Since this legacy technology represents a significant capital investment, vendors prefer to keep this technology in place rather than substituting new technology. However, vendors also have the pressure to upgrade communication systems to provide end-users and service providers with the latest real-time voice and video capabilities. As a result, there is a need for compatibility between the legacy technologies and the newer technologies.

A number of communications standards have been promulgated by the Institute for Electrical and Electronic Engineers (I.E.E.E.) which address issues of compatibility between legacy devices and the newer communications devices as well as communications devices that come from different vendors.

One area of communications that has seen a significant amount of advancement is Local Area Networking (LAN) communications. There is an installed base of LAN's that communicate at 10 megabits per second. These systems represent the legacy technology. In addition, newer hardware is in place which is contemplated to communicate at gigabit speeds. In addition, in the middle of the far end technologies of 10 megabits per second and gigabit speed devices, is 100-megabit technology, which is also deployed.

As a result modem communications standards and systems have to accommodate communications between systems that have disparate technology (i.e. communicate at different speeds). In addition, it would be preferable to address the communications issues between these disparate technologies in an automated way without the need for human intervention such as toggling or modifying switch settings. Finally, it is preferable that this function be handled at the lowest possible level of the communications process. For example, using the Open System Interconnect (OSI) reference model layers of physical layer, data link layer, network layer, transport layer, session layer, presentation layer and applications layer. It would be preferable to place the functionality for addressing these disparate technologies at the lowest possible layer, such as the physical layer. Placing the functionality at this layer would open the higher layers to handling other functions and thereby improve the overall performance of the system.

While systems and standards are in place to negotiate some of the discrepancies (i.e. speed, protocols) between these disparate systems, many of these systems are not automated. In addition many of the systems require higher-level functionality sometimes depending on higher-level services in the applications layer to negotiate these discrepancies. Therefore, it is important to develop a system that negotiates the discrepancies between the newer systems and the legacy systems. In addition, it would be beneficial to do so utilizing the lowest possible layers of the OSI model for implementation.

In addition, even after mechanisms for enabling communications, such as standards have been developed, there may still be times when the systems don't operate properly. For example, there are times when communications devices do not operate at their highest possible speed because of wiring problems. Some standards place a length restriction on the cables used between devices. If the communications devices are connected with cables that are too long, the devices may communicate at a sub-optimal speed. In addition, the wrong cables may be used (i.e. 2 pairs of cables when 4 pairs of cable are required). Finally, flaws in the logic required for communications may cause a device to operate in a sub-optimal way. For example, if the equalizer is not working properly, a system that is designed to operate at 1000 megabits per second may only operate at 10 megabits per second.

As a result of the wiring or systems problems, the speed of communications between two devices may be drastically reduced. In other words, the speed that data can be communicated along the wire (i.e. wire-speed), may be reduced. Therefore, it would be beneficial to implement a technique that takes advantage of the maximum wire-speed available, when two devices are unable to communicate at the optimal (i.e. factory defined) speed.

SUMMARY OF THE INVENTION

A method and apparatus is disclosed, which enables communications devices to take advantage of the maximum wire-speed available, when two devices are unable to communicate at their optimal speed. The method of the present invention, utilizes auto-negotiation to address the communications discrepancies between disparate systems and to ascertain the maximum possible wire-speed available for communications.

Auto-negotiation is a messaging process used by two devices (i.e. link partners) in determining at what speed they should communicate, whether both devices are capable of simultaneous two way communication (full-duplex) or alternative one way communication (half-duplex), whether flow control should be used in one direction, both directions or at all. In addition, auto-negotiation messages can also report fault conditions and vendor specific or product specific data.

In the method of the present invention, an auto-negotiation feature is disclosed which enables two devices to communicate and come to an agreed feature set for communication, without creating a loop or failing to communicate by dropping the connection. A first device communicates a set of capabilities to a second device (i.e. a link partner). If the second device supports this set of capabilities, a connection is attempted according to this set of capabilities and, if successful, the two link partners communicate according to this set of capabilities.

However, if the link cannot be established according to this set of capabilities, the first device downgrades its set of capabilities and communicates this downgraded set of capabilities to the second device. The first and second devices then attempt to communicate based upon this downgraded set of capabilities. If a link is established, operation continues according to this downgraded set of capabilities. However, if link establishment is unsuccessful for this downgraded set of capabilities, the first device downgrades its set of capabilities again and communicates such set of capabilities to the second device. The process of downgrading capabilities is continued until communication is established between the first device and the second device or until a predefined maximum is met.

Further, the method of the present invention is implemented in an efficient manner to enable greater functionality in the system. The method is implemented using physical layer functionality in a single monolithic chip.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION

Figure 1:
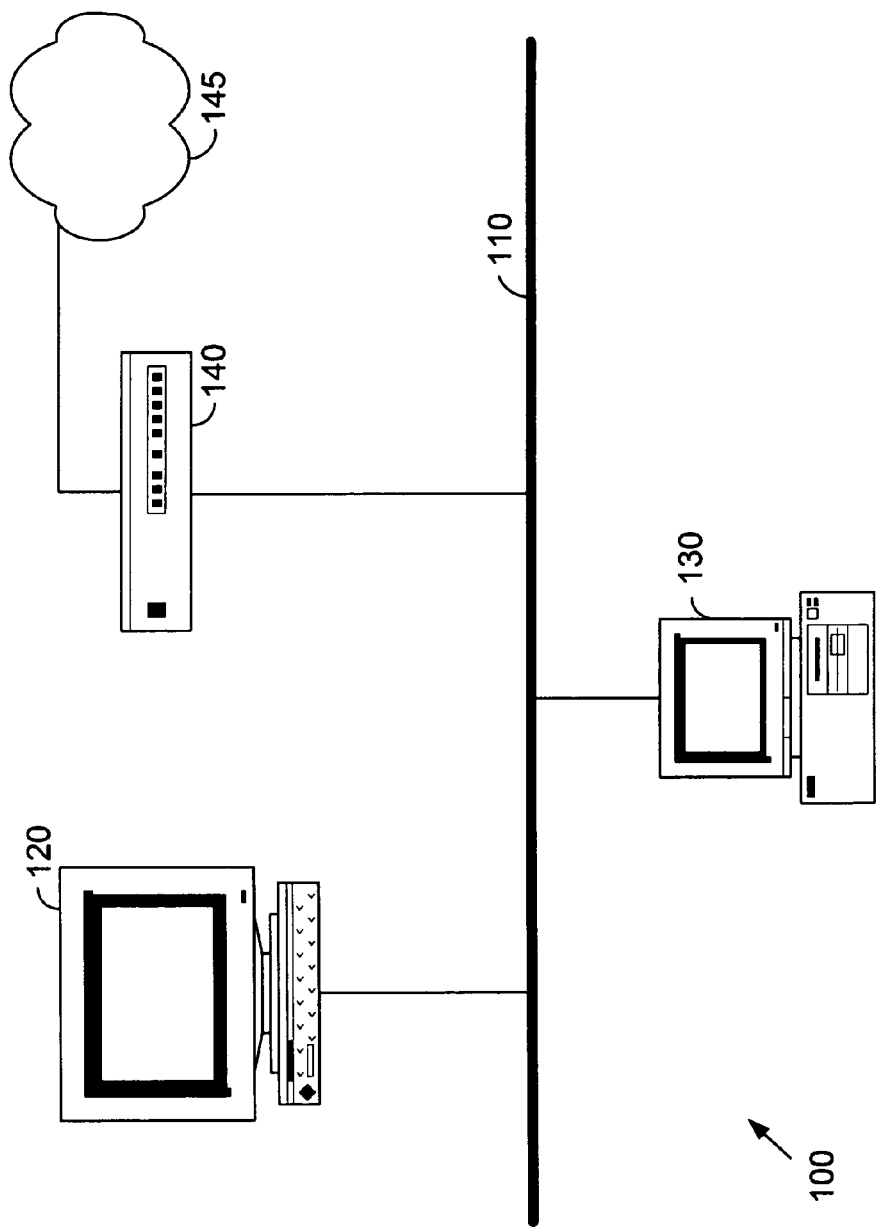
FIG. 1 displays a conceptual drawing of a Local Area Network (LAN)

A system embodying the present invention is displayed in FIG. 1. A conceptual drawing of a LAN 100, connecting computers 120 and 130 with a communication device 140 is displayed in FIG. 1. The LAN 100 facilitates communications between the computers along a medium 110. The medium 110 may be twisted pair cable, coaxial cable, fiber cable, copper cable or any other cable identified by evolving communications standards. The communications device 140 may be a bridge, a router, a hub, or a switch. In addition, the communications device 140 may connect the computers 120 and 130 to each other, as in the case of a hub. Finally, the communications device 140 may connect the computers 120 and 130 to the Internet or to another LAN as shown by 145. Each computer 120 and 130, houses a network interface card. The network interface cards provide the interface to the other devices and to the communications device 140. In addition, a network interface card can also be found in communications device 140.

The intelligence for communicating between computers 120, 130 and communications device 140 is often found in the interface card. Network Interface cards will often contain the transmit and receive (transceiver) logic necessary to enable communications between computers 120, 130 and communications device 140. The overall logic and intelligence for this communication may be embodied in a single chip as implemented in the method of the present invention or the logic and intelligence may be spread out among several chips located on the network interface cards. These chips often perform the functions of a transceiver, transmitting and receiving information related to communications across the LAN.

In addition, the logic and intelligence required for communications between computers 120, 130 and communications device 140 may also reside in higher-level software located in computers 120, 130 and communications device 140. Finally, a combination of chips located on network interface cards in conjunction with the higher-level software functionality of computers 120, 130 and communications device 140, may provide the logic and intelligence required to perform communications across the Local Area Network 100.

The intelligence required to perform communications across the Local Area Network is defined in a number of Institute for Electrical and Electronic Engineers (IEEE) standards. These standards define the process and procedures required to establish, maintain, conclude and reinitiate communications between devices. One particular standard IEEE std 802.3, 2000 edition, entitled "Carrier sense multiple access with collision detection (CSMA/CD) access method and physical layer specifications," is specifically directed to communication in a Local Area Network.

The IEEE standards facilitate communication by setting up a set of rules required for the devices to communicate. For example, computer 120 and computer 130, both of FIG. 1, may be different types of computers. They may be manufactured by different vendors, one may be a legacy system while the other may be a newer computer. As a result, one of the computers may communicate at one speed on one type of communications medium, while the newer computer may communicate at a higher speed on another type of communications medium. Finally, the capability to have full-duplex communications may be resident in the new computer while the older system may only have the capability to communicate at half-duplex. Once the manufacturers conform to the IEEE standards, they can assume that the two computers will communicate with each other regardless of their respective differences in speed and communications capabilities.

Figure 2:
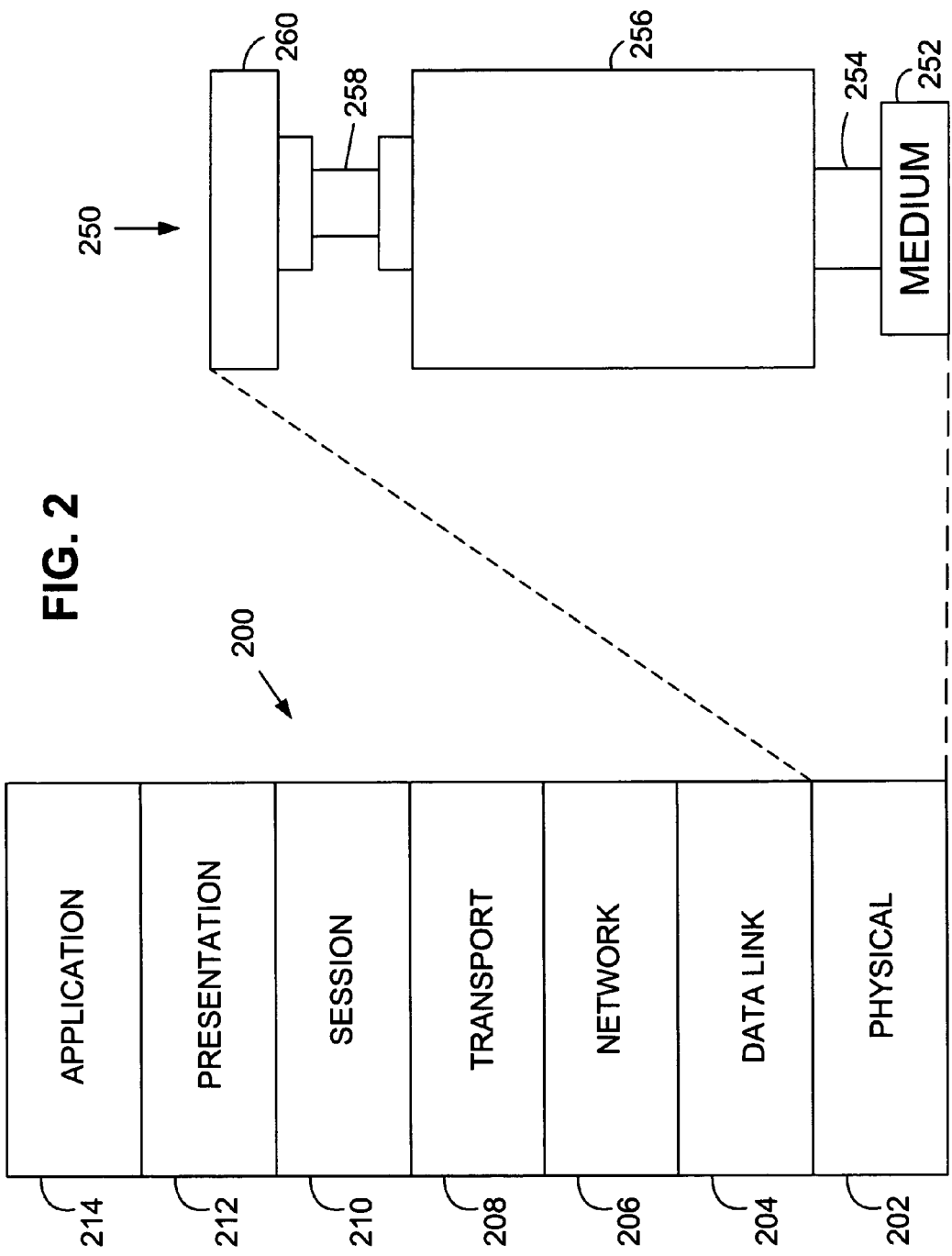
FIG. 2 displays a mapping between the Open System Interconnection (OSI) model and the functional layers of a LAN as described in the Institute for Electrical and Electronic Engineering (IEEE) Standards.

The IEEE communications standards follow a reference model known as the Open System Interconnection (OSI) reference model. FIG. 2 displays a mapping of the OSI reference model 200 and the implementation of these layers in the IEEE 802.3 standard, as shown at 250. The OSI reference model breaks communications functionality into several layers such as the physical layer 202, the data link layer 204, the network layer 206, the transport layer 208, the session layer 210, the presentation layer 212 and the application layer 214. The IEEE 802.3 model shown at 250, is performed in the physical layer 202, of the OSI model 200.

The IEEE 802.3 model shown at 250, facilitates the use of several mediums as depicted by 252. For example, twisted pair technology, coaxial cable technology, copper technology and fiber technology are all anticipated as potential mediums. In addition, LAN's communicating information at legacy speeds such as 1 Megabit/sec and 10 Megabit/sec are contemplated. In addition, some of the newer technologies such as 100 megabit/sec and 1000 megabit/sec are considered.

In the IEEE 802.3 model 250, the medium 252 interfaces into a first interface 254. The first interface 254 is a medium dependent interface (MDI). The MDI 254 is a dependent interface which is established to work with a specific medium such as coaxial cable or twisted pair. The first interface 254 then connects with a second interface 256. The second interface 256 varies depending on the communications technology. At speeds of 100 Mb/s and 1000 Mb/s the second interface includes a physical medium dependent (PMD) layer, which then interfaces to a physical medium attachment (PMA) layer, which in turn interfaces with a physical coding sublayer (PCS). The second interface 256 then connects with a third interface 258 that represents a media independent interface (MII) in 100 Mb/s systems or a gigabit media independent interface (GMII) in 1000 Mb/s systems. Finally in 100 Mb/s systems and 1000 Mb/s systems a third interface 258 connects to a reconciliation layer 260. The first, second and third interfaces are adjusted for 10 Mb/s and 1 Mb/s systems, however, similar functionality is provided.

The initial communications between disparate systems such as 10 Mb/s, 100 Mb/s and 1000 Mb/s systems is controlled by a process known as auto-negotiation in the IEEE 802.3 standard. Auto-negotiation enables two devices that share a link segment (i.e. LAN) to automatically communicate their respective capabilities and take advantage of the maximum common capability, of the respective devices. For example, if two devices are able to communicate at 10 Mb/s, 100 Mb/s and 1000 Mb/s, the auto-negotiation function enables the devices to communicate this capability to each other and then communicate at the highest common denominator such as 1000 Mb/s. The auto-negotiation function resides in the physical layer in the OSI model 200 of FIG. 2, between the first interface 254 and the bottom of the second interface 256 of the IEEE 802.3 layered model. In the IEEE reference model 250 the auto-negotiation function communicates with both the PMD layer and the PMA layer contained in the second interface 256, through different service messages.

Figure 3:
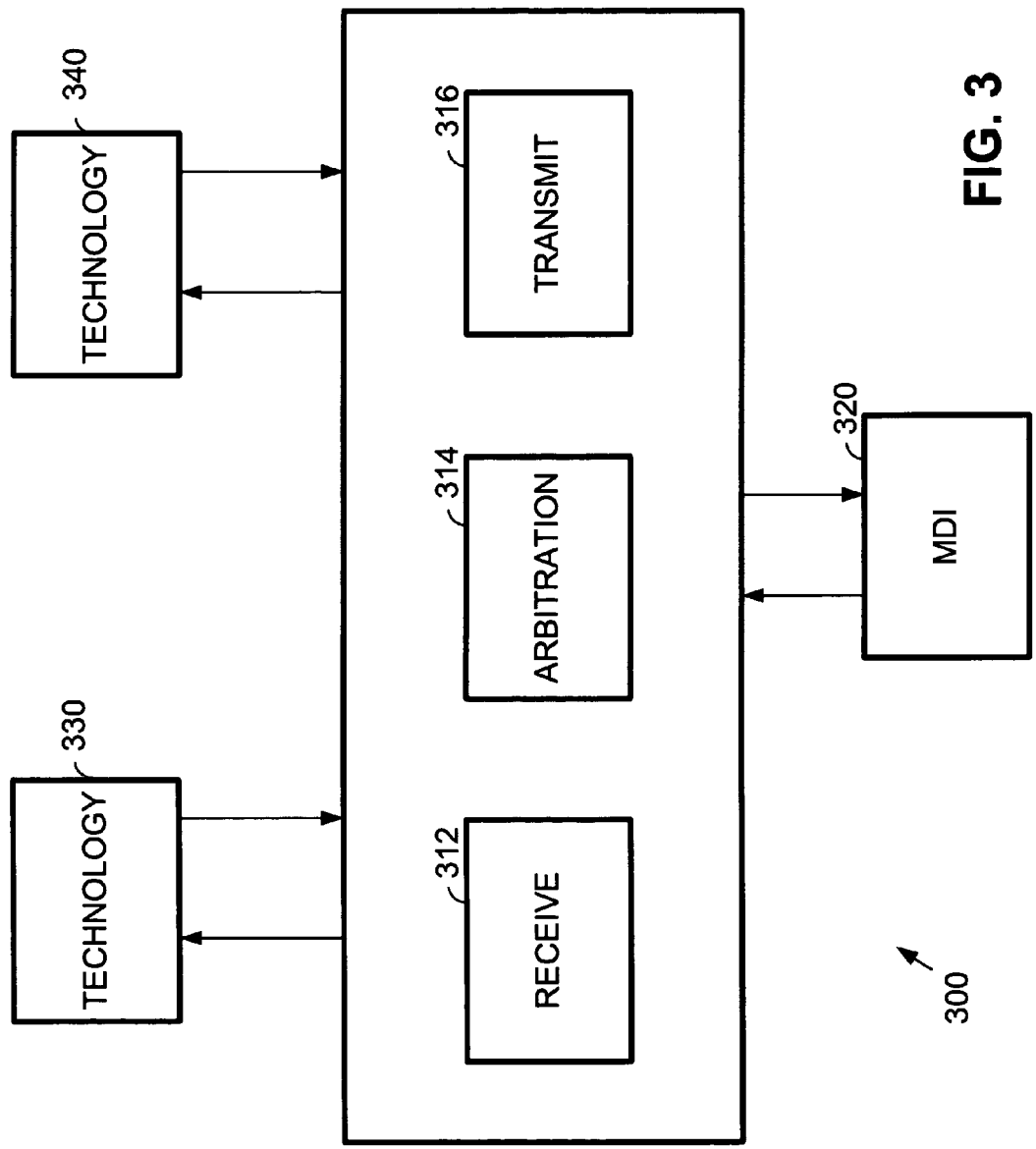
FIG. 3 displays a function block diagram of the auto-negotiation function.

The auto-negotiation function enables two link partners on a common link segment to advertise their respective capabilities and communicate at their highest common capability level. FIG. 3 displays a high level view of the auto-negotiation function. The auto-negotiation function 300 interfaces with a medium dependent interface 320. The medium dependent interface is attached to the communications medium which can be coaxial cable, copper, twisted pair cable or fiber. Conceptually, the auto-negotiation function 300 interfaces between the media dependent interface (MDI) 320 and different technology specific interfaces such as 330 and 340. The auto-negotiation function 300 arbitrates as shown at 314 between the receive function 312 and the transmit function 316. When technology specific interfaces (i.e. link partners) such as 330 and 340 attempt to communicate with each other, the auto-negotiation function addresses issues such as what speed the technology interfaces should operate at, whether the technology interfaces are capable of full-duplex communications or half-duplex communications. The auto-negotiation function addresses whether flow control should be used in one direction, both directions or not at all. Finally, auto-negotiation messages can carry additional information such as reporting remote fault conditions, vendor specific or product specific data. In addition, in 1000 Mb/s technology that uses twisted pair cabling, the auto-negotiation function allows for a negotiation of which interface will act as a master timer or slave timer for the link. The master uses its own clock and the slave basis its' timing on the data stream coming from the master.

The auto-negotiation function is implemented by sending messages or information between the two technology interfaces. Backwards compatibility is maintained with legacy technologies such as 10 Mb/s by using signaling information that was present in 10 Mb/s systems. Previous 10 Mb/s twisted pair systems checked to maintain the integrity of the link using a low level signaling mechanism called a normal link pulse (NLP). The NLP is issued on a periodic basis by two devices on a link and is used to check whether the link is up or down. The newer systems such as 100 Mb/s and 1000 Mb/s systems build on this concept by sending a burst of NLP pulses between communicating devices instead of just a single NLP. This burst of pulses is called a fast link pulse (FLP). The FLP consist of 33 pulse positions that carry a 16-bit message and 17 odd numbered pulses that are used for clocking. Auto-negotiation is performed between two interfaces by using the FLP's. In addition, the FLP's serve as a mechanism for carrying auto-negotiation messages between two negotiating interfaces.

The FLP's are used to advertise a first set of capabilities from an initiating link partner. In the method of the present invention, if the link partners are unable to communicate using the first set of capabilities, the initiating link partner will then have the ability to downgrade its capability set to a second capability set and use the FLP signaling to communicate the second capability set to the receiving link partner. If the link cannot be established according to the second capability set, then the process starts over and a third, downgraded capability set may be advertised.

Figure 4:
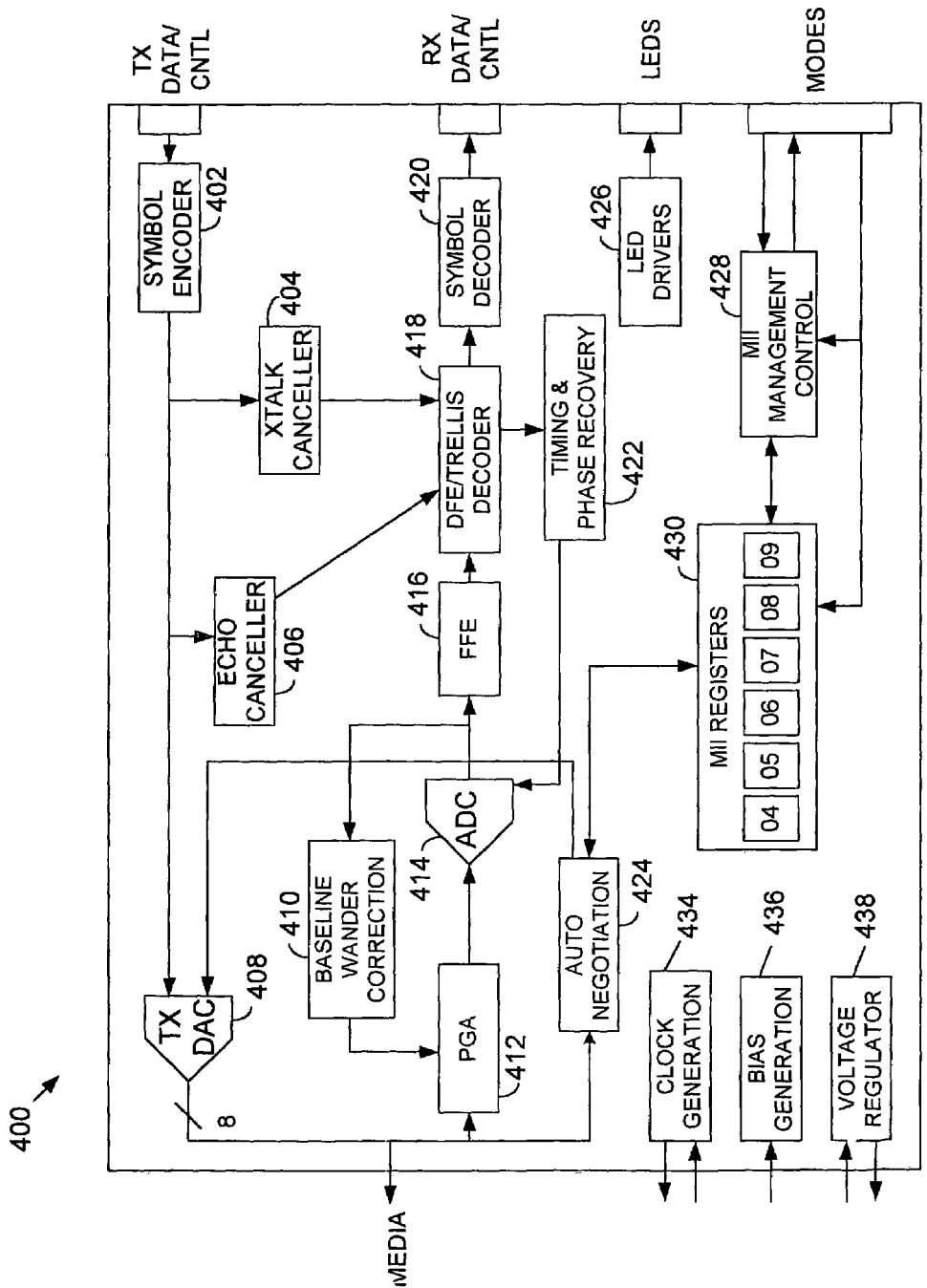
FIG. 4 displays a functional block diagram of a chip which implements the present invention.

FIG. 4 displays a functional block diagram of a single-chip integrated multi-speed Ethernet transceiver 400, which implements the method of the present invention. The functional block diagrams presented in FIG. 4 can be implemented using standard digital signal processing circuitry. The multi-speed transceiver consist of a 1000BASE-T (1000 MB/s CSMA/CD local area network using four pairs of category 5 balanced copper cabling), 100BASE-TX (100 MB/s CSMA/CD local area network over two pairs of Category 5 unsheilded twisted pair or shielded twisted pair) and 10BASE-T (10 MB/s CSMA/CD local area network over two pairs of twisted pair telephone wire) technology on a single monolithic chip. The chip performs all of the physical layer functionality for the 1000BASE-T, 100BASE-TX and 10BASE-T Ethernet standards.

In FIG. 4, an encoder 402 performs signal encoding on an incoming data stream. A transmit Digital-to-Analog (DAC) 408 performs signal shaping, which decreases unwanted high frequency signal components, thus reducing EMI. In addition, the transmit DAC 408 performs pre-equalization of the encoded signal. The Analog-to-Digital Converter (ADC) 414 samples incoming data and feeds the output to a Digital Adaptive Equalizer. Since the single chip 400 architecture of FIG. 4 transmits information on four pairs of media during some modes of operation, cross talk is introduced. A cross talk canceller 404 removes this impairment and separates independent signals. As a result of the bi-directional nature of each transmitter, an echo canceller 406 is used to remove transmitted signal impairment from an incoming receive signal.

The monolithic chip 400 further includes a digital adaptive equalizer which removes inter-symbol interference created by the transmission channel media. The digital adaptive equalizer is a combination of a Feed Forward Equalizer 416 and a Decision Feedback Equalizer 418. In the monolithic chip 400, the 1000BASE-T and 100BASE-TX data streams are not always DC balanced. Because the receive signal must pass through a transformer, the DC offset of the differential receive input can wander. This effect is know as baseline wander and can greatly reduce the noise immunity of the receiver. The chip 400 reduces the baseline wander by removing the DC offset from the input signal, and thereby significantly reduces the probability of receive symbol error. The chip 400 has auto-negotiation functionality as shown as 424. The chip 400 negotiates its mode of operation over a twisted pair link using the auto-Negotiation mechanism defined in the IEEE specifications. Auto-Negotiation can be enabled or disabled by hardware or software control. When the Auto-Negotiation function is enabled, the chip 400 automatically chooses the mode of operation by advertising its abilities and comparing them with those received from its link partner. If the link cannot be established using the advertised capability set, the method of the present invention is used to downgrade to a second capability set and re-advertise the second capability set to the link partner. Link establishment will then be attempted according to the second capability set. The process logic for the method of the present invention is implemented by the auto-negotiation functional block 424.

The logic and intelligence for the chip can be configured to advertise various capabilities. Among these capabilities are 1000BASE-T full duplex and/or half-duplex, 100BASE-TX full duplex and/or half-duplex, and 10BASE-T full-duplex and/or half-duplex. A media independent interface is the digital data interface between the MAC and the physical layer when functioning in the 10BASE-T and the 100BASE-TX modes. The media independent interface registers 430 are the registers specifically used by the method of the present inventions. Specifically registers 04 and 09 contain coding which defines the capability set of a link partner. These registers include information on the capability set of the initiating link partner which is then advertised. If the link cannot be established according to the advertised capability set, adjustments to these registers are performed which reflect a downgrade to a reduced capability set and the new downgraded capability set is re-advertised.

A Management interface 428 contains a set of multipurpose registers for management and control. Functional block diagrams for a timing and phase recovery 422, a PGA 412, clock generation 434, bias generation 436 and voltage regulation 438 and Light Emitting Diode circuitry 426 are also displayed.

Figure 5:
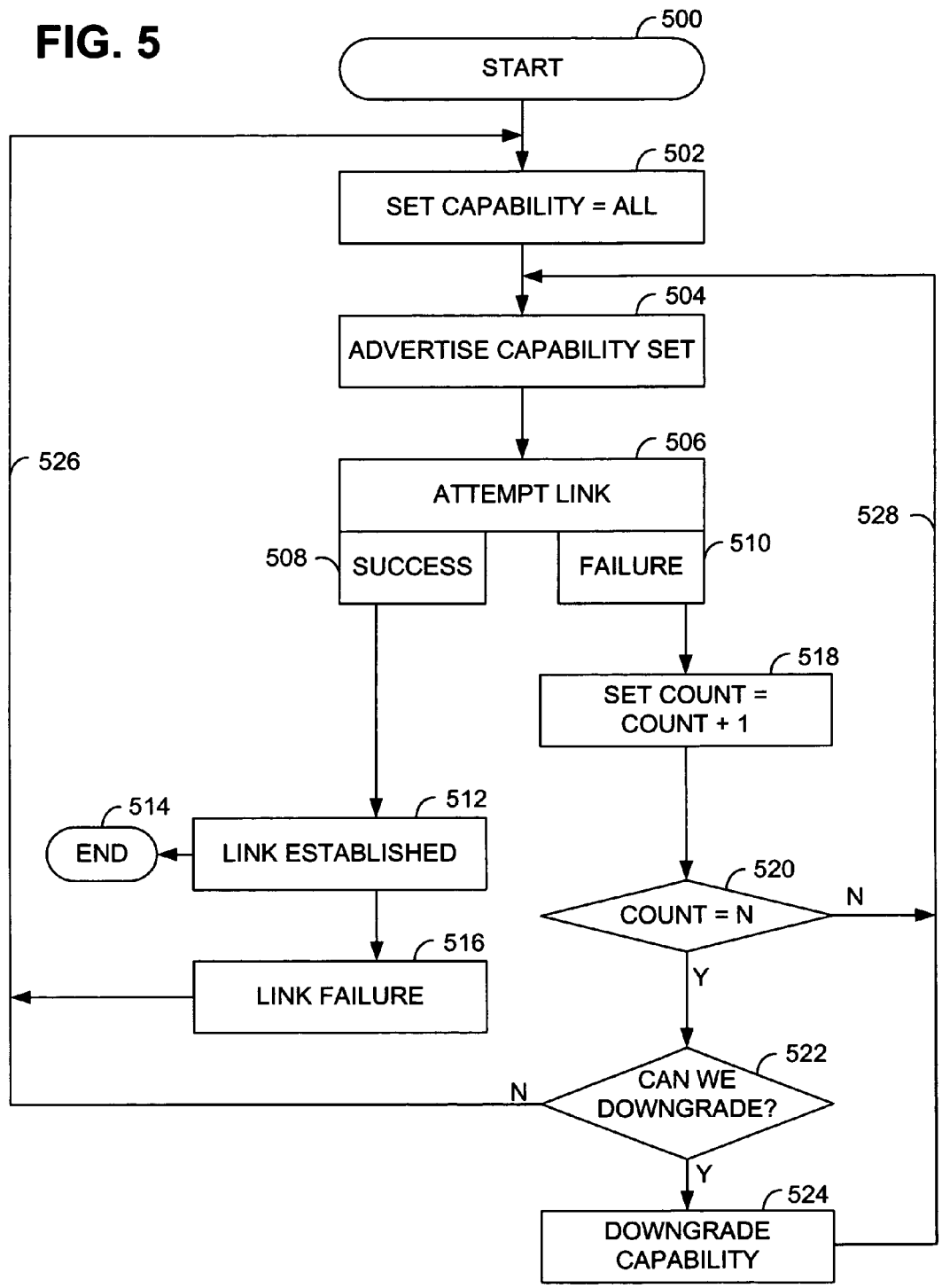
FIG. 5 displays a high level flow chart of the method of the present invention.

A flow chart displaying the method of the present invention is shown in FIG. 5. During auto-negotiation the disclosed method enables two link partners to establish an appropriate linking speed and functionality without hanging or creating a loop in the system. The method starts at 500. The capability of a link partner is ascertained by reviewing the contents of the MII registers 430 of FIG. 4. In the disclosed process, the system starts with all of the capabilities available for use. For example, the all capabilities designation at 502 may include 1000BASE-T, 100 BASE-T and 10BASE-T, as well as full-duplex and half-duplex. At 504, the transmitting link partner advertises this ability to a receiving link partner.

The two link partners then attempt to make a link as shown in 506. If the link is successful as shown at 508, the link is established as shown in 512 and there is an end to the auto-negotiation process as shown in 514. When the link is established at 512, the link partners are able to communicate with each other, using the appropriate communication parameters. However, even after the link has been established, the link can still go down or fail as shown at 516. Should this happen, the system would re-advertise the full set of capabilities as shown by the ioop back at 526. Should the link fail when attempting to establish communications as shown at 510, a link fail counter is increased by one as shown at 518. A test is then made at 520 to determine if the count equals a predefined number (N). The predefined number represents the number of attempts that the link partner should make before there is a downgrade in the set of capabilities advertised by the initiating partner.

If the count does not equal the pre-established number then the initiating partner would re-advertise its previous capability set as shown in 528. In the alternative, if the count does equal the predefined number, then link establishment with the existing capability set has failed the predefined number of attempts. Therefore, the capability set should be downgraded as shown at 522. If there are no other options in the capability set and the system is unable to downgrade, then the full set of capabilities advertised by the link partner are re-advertised as shown by the loop back 526. If the transmitting link partner still has capabilities to which the system can downgrade, then the transmitting link partner would downgrade to a lower capability set as shown at 524 and then advertise the new capability set as shown at 504. In an alternate operation, a negative determination at step 520 would result in moving to step 506 without re-advertising the capability set.

Figure 6:
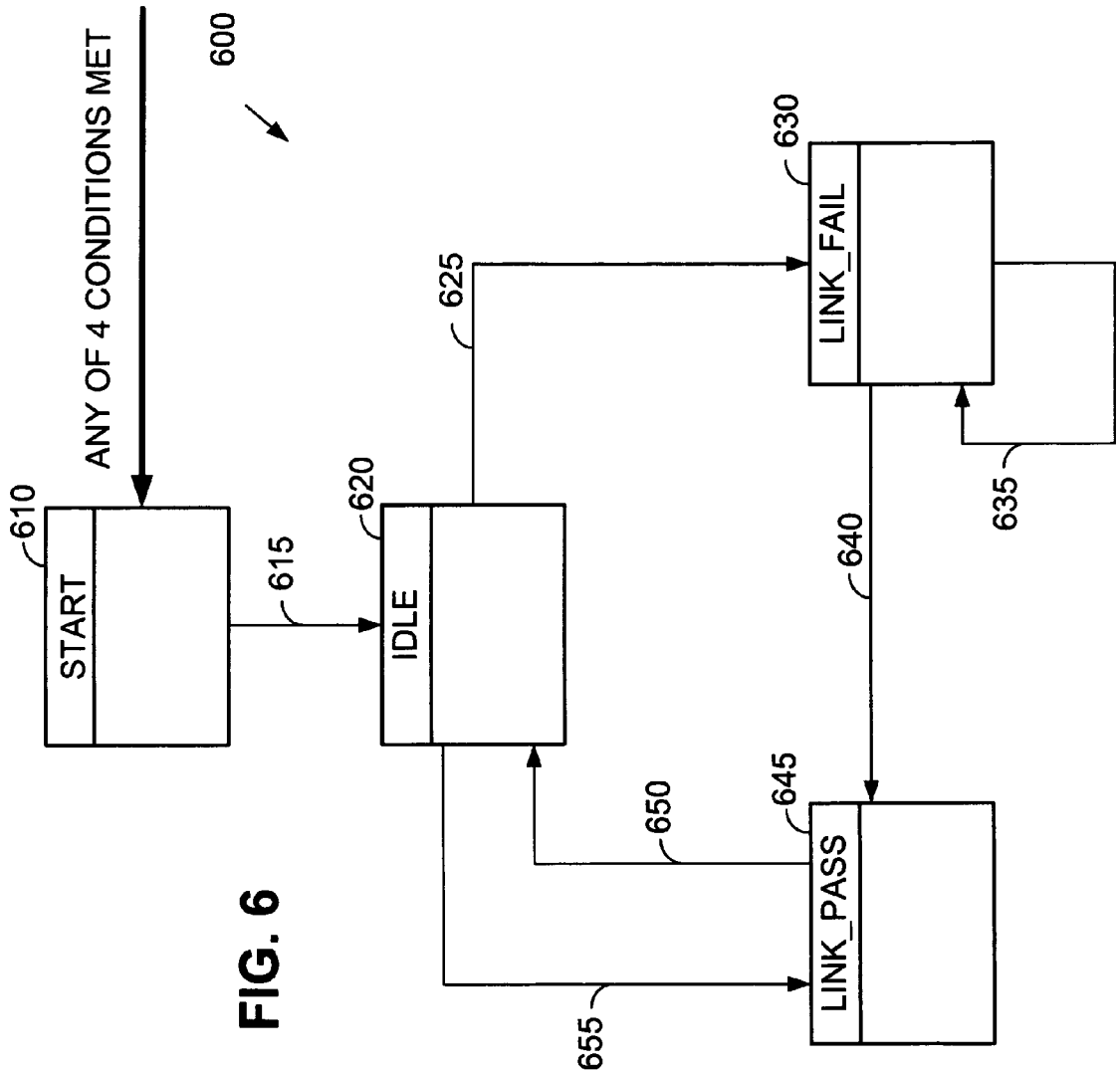
FIG. 6 displays a state diagram of the method of the present invention.

A state diagram of the present invention is detailed in FIG. 6 as shown by 600. The method of the present invention may be implemented with a state machine, which includes a START state 610, an IDLE state 620, a LINK_FAIL state 630 and a LINK_PASS state 645. Variables associated with the state machine detailed in FIG. 6 are given in Table I.

TABLE 1

| Variable | Definition |
| --- | --- |
| adv_baset | 10BASET advertisement variable - contains information on the 10BASET capability set. In the method of the present invention adv_baset is loaded from registers 5 & 6 of state variable mr_adv_ability as follows, adv_baset <= mr_adv_ability [5] + mr_adv_ability [6] |
| adv_tx | 100BASE-T advertisement variable - contains information on 100 megabit capability set. In the present invention adv_tx is loaded from registers 7 & 8 of state variable mr_adv_ability as follows, adv_tx <= mr_adv_ability [7]+mr_adv_ability [8] |
| autoneg_enable | auto-negotiation enable variable - denotes the enabling and the disabling of the auto-negotiation function. |
| downgrade_abilities | downgrade capability variable - a status check that denotes whether the link partner capabilities have been downgraded. |
| flp_link_good_check | good FLP link check variable - Indicates that fast link pulse (FLP) signaling has been completed successfully. |
| link_fail_inhibit_timer_done | link fail timer done variable - timer for qualifying a link status as failed or as ready when a link partner is attempting to establish a link. |
| mask_gig | gigabit mask variable - indicates the availability of gigabit technology. |
| mask_tx | 100 megabit mask variable - indicates the availability of 100 megabit technology. |
| mr_adv_ability | advertising ability variable - a 16 bit array that contains the capability of a link partner. |
| mr_autoneg_complete | auto-negotiation complete variable - status indicating whether auto-negotiation has successfully completed or not. |

TABLE 1-continued

| Variable | Definition |
| --- | --- |
| mr_hcd | system highest common denominator variable - indicates the link partners highest common denominator capability. |
| mr_restart_negotiation | negotiation restart variable - Denotes whether auto-negotiation has restarted. |
| nway_arb_fsm | arbitration state variable - indicates whether the FLP link test was completed successfully. |
| previous_hcd | previous highest common denominator variable - indicates the previous highest common denominator capability. |
| qual_mr_adv_ability | qualified advertising ability variable - a 16 bit array that contains the capability of a link partner after the mr_adv_ability has been masked by the mask_gig and mask_tx. |
| reset | reset variable - Indicates that the system has been reset. |
| samehcd_linkfail_ctr | link fail counter variable - counts link failure when using the same highest common denominator capability. |
| tx_fdx | 100BASET full-duplex - a system operating full duplex at 100 megabits per second. |
| wirespeed_enable | wire speed enable variable - indicates that the wirespeed function is enabled. Wirespeed is a mode of operation that controls the auto-negotiation advertising. In the present invention wirespeed is downgraded when mask_gig and/or mask_tx are set. |
| 1000tx_fdx | 1000BASET full-duplex - a system operating full duplex at one gigabit per second. |

The disclosed method accomplishes auto-negotiation by moving between the START 610, IDLE 620, LINK_FAIL 630, and LINK_PASS 645 states based on defined criteria. The defined criteria are implemented by setting physical registers in the semiconductor chip that are defined by the IEEE 802.3 standard. In addition, several variables were developed for the implementation of the present invention. For example a state variable, such as an auto-negotiation restart variable, may be set to true or false based on bit settings defined by IEEE 802.3. As an example, true or false may be represented by 00 for false or 01 for true. This true or false state as represented by 01 or 00 would be loaded into a register related to the auto-negotiation restart state variable. As a result when the logic of the system needs to test for the auto-negotiation restart state variable, a test is made of the specific register carrying this state variable information (i.e. 01 or 00) and the system is able to determine whether the auto-negotiation restart is enabled (i.e. true) or disabled (i.e. false).

In the method of the present invention, a state machine moves between states based upon a set of predefined criteria. The predefined criteria are implemented using newly developed state variables and state variables identified in the IEEE 802.3 standard. The method of the present inventions includes four states: START state 610, IDLE state 620, LINK_PASS state 645, and LINK_FAIL state 630.

At startup or reset, the state machine resides in the START state 610 and remains in the START state 610 as long as any one (or more) of the following four conditions is met: (1) if, the system is reset (i.e. the variable associated with system reset is enabled), (2) the auto-negotiation is disabled, (3) the wire-speed is disabled, or (4) auto-negotiation is set to restart. The state machine will also transition from any of the other states, IDLE state 620, LINK_FAIL state 630, or LINK_PASS state 645 when any of these conditions is met. Such operation is illustrated via the heavy line entering the START state 610. The four conditions that result moving to (or remaining in) the START state 610 may be represented using the state variables defined in TABLE I, with the following expressions:

reset=true+
autoneg_enable=false+
wirespeed_enable=false+
mr_restart_negotiation=true.

The state machine moves from the START state 610 to the IDLE state 620 along path 615 when none of the four above-described conditions is satisfied. When the state machine moves to the IDLE state 620, five assignments occur: (1) The previous highest common denominator established (i.e. 100BASE-T, 1000BASE-T) is set to zero, (2) the link fail counter is set to zero, this is done to initiate the system, (3) the downgrade abilities variable is set to false meaning that the system has not downgraded its abilities, (4) the 100 megabit register, and (5) the gigabit register are not masked out (i.e. set to zeros), meaning that these capabilities are still available.

These five assignments may be represented using the state variables defined in TABLE I, with the following expressions:

previous_hcd←None
samehcd_linkfail_ctr←0
downgrade_abilities←false
mask_gig←false
mask_tx←false.

The state machine moves from the IDLE state 620 to the LINK_FAIL state 630 along path 625. In the IDLE state 620, auto negotiation is performed between the link partners (e.g., step 504 of FIG. 5). After auto negotiation is completed, a timer is set and the link partners attempt to establish a link according to the negotiated parameters (e.g., step 506 of FIG. 5).

If the timer expires before the link is established, the state machine moves from the IDLE state 620 to the LINK_FAIL state 630 along path 625 (e.g., step 510 of FIG. 5). Movement from the IDLE state 620 to the LINK FAIL state 630 may be represented using the state variables defined in TABLE I, with the following expressions:

nway_arb_fsm=flp_link_good_check
link_fail_inhibit_timer_done=true.

If link is successfully completed before expiration of the timer, the state machine transitions from the IDLE state 620 to the LINK_PASS state 645 via path 655 (e.g., step 508 of FIG. 5). Movement from the IDLE state 620 to the LINK_Pass state 645, along path 655, may be represented with the following expression using the state variables defined in TABLE I:

mr_autoneg_complete=true.

In the LINK_FAIL state 630, the state machine may stay in the LINK_FAIL state 630 via path 635. Along path 635, the link partners may continue re-attempt link establishment with the same set of negotiated parameters (e.g., steps 518, 520, and 506 of FIG. 5 without execution of step 504). Alternately, the link partners may reenter auto negotiation operations, establish new negotiated parameters, and attempt to establish a link with these new negotiated parameters (e.g., steps 518, 520, 522, 524, 504, and 506 of FIG. 5). Finally, along path 635, auto negotiation operates may commence anew, be performed, and link establishment attempted accordingly (e.g., steps 518, 520, 522, 502, 504, and 506 of FIG. 5). Operation along path 635 may be represented using the state variables defined above, with the following expressions:

nway_arb_fsm=flp_link_good_check
link_fail_inhibit_timer_done=true.

Operation along path 635 may be alternately described as follows: In the LINK_FAIL state 630, two alternative operations may occur, depending upon whether a link has been attempted at a highest common denominator of advertised capabilities between the link partners. If the highest common denominator (i.e. superset of system capabilities) equals the previously used highest common denominator, the device has already advertised its superset of capabilities. If the link has failed a predefined number of times (i.e. four times as established by the link fail counter), the link partner was unable to communicate when advertising its highest set of capabilities a predefined number of times. Thus, the device determines whether it can downgrade its capabilities by determining whether the gigabit capability and the 100 megabit capability are still available (i.e. have not been masked out). In the alternative, if the link has failed less than four times the system would increase the link fail counter by 1 and continue without reducing its advertised capabilities.

If the highest common denominator (i.e. superset of system capabilities) for the system does not equal the previously used highest common denominator, the link fail counter is set to 1 and the previous highest common denominator capability is set to the system highest common denominator capability. In other words, the system has advertised its superset of capabilities less than the predefined number of times, therefore the system should attempt to link again using the superset of capabilities.

Processing in the LINK FAIL state as shown at 630 along path 635 may be represented using the state variables defined above, with the following expressions:

1000BASE-T respectively, are advertised. If the same highest common denominator fails to link a predefined number of times, then the highest advertised capability that is not already masked out will be masked out. When both 100BASE-T and 1000BASE-T functionality are masked out and the same highest common denominator fails a predefined number of times, then all the advertised abilities in register 4 & 9 are advertised. If a link passes and later fails, then all of the advertised capabilities in register 4 & 9 are advertised. In the case where either 100BASE-T or 1000BASE-T is masked out, then a variable known as the wirespeed downgrade status is active, indicating that not all of the requested advertised abilities are advertised to the link partner. It should be noted that 10BASE-T is always advertised as required by MII register 4 and is not effected by the wirespeed mode. In addition, the wirespeed mode will not mask out 100BASE-T or 1000BASE-T capabilities unless there are other capabilities available to be advertised. The qual_mr_adv_ability and qual_reg 9 may be represented using the state variables defined in TABLE I, as follows:

--- qual_mr_adv_ability [15:0] <= mr_adv_ability [15:9] &
                    (mr_adv_ability [8] * mask_tx = false) &
                    (mr_adv_ability [7] * mask_tx = false) &
                    mr_adv_ability [6:0]
qual_reg 9 <= reg 9 [15:10] &
              (reg 9 [9] * mask_gig = false) &
              (reg 9 [8] * mask_gig = false).

---

During this continued attempt to establish a link between the link partners along path 635, upon a successful link establishment, the state moves from the LINK_FAIL state 630 to the LINK_PASS state 645 along path 640. Movement from the LINK_FAIL state 630 to the LINK_PASS state 645

---

```
IF(mr_hcd = previous_hcd) THEN
        IF(samehcd_linkfail_ctr = 4) THEN
                downgrade_abilities <= true
                samehcd_linkfail_ctr <= 0
                IF (mask_gig = false *(adv_tx = true or adv_baset = true)
                        *(previous_hcd = tx 1000 or previous hcd = 1000tx_fdx))
                THEN
                        Mask_gig <= true
                        Mask_tx <= false
                ENDIF IF(mask_tx = false *(adv_baset=true) and (previous hcd = tx
                or
                        previous_hcd = tx_fdx))
                THEN
                        Mask_gig <= true
                        Mask_tx <= true
                ELSE
                        Mask_gig <= false, mask_tx <= false;
                ENDIF
        ELSE
                samehcd_linkfail_ctr <= samehcd_linkfail_ctr + 1
        ENDIF
ELSE
        samehcd_linkfail_ctr <= 1
ENDIF
        previous_hcd <= mr_hcd
```

---

Two variables, qual_mr_adv_ability and qual_reg 9, are used in the implementation of the present invention to substitute for mr_adv_ability and reg 9 in the IEEE 802.3 standard. At startup all the 100BASE-T and 1000BASE-T modes shown as the MII registers 4 and 9, which store information denoting the capabilities of 100BASE-T and along path 640 may be represented with the following expression, using the state variables defined in TABLE I:

mr_autoneg complete=true.

In the LINK_PASS state 645, the system highest common denominator of capability is assigned to the previous highest common denominator of capability. In other words, when the system passes auto-negotiation there is agreement between link partners on a capability set. The successful capability set should be used as the previous highest common denominator should there be a need for a restart, re-negotiation, etc. Processing in the LINK_PASS state as shown at 645, may be represented using the state variables defined in TABLE I, with the following expressions:

previous_hcd←mr_hcd
samehcd_linkfail_ctr←0

When the state machine is in the LINK_PASS state 645 and the link goes down, the system moves from the LINK_PASS state 645 to the IDLE state 620 along path 650. Movement from the LINK_PASS state 645 to the IDLE state 620 along path 650 may be represented with the following expression, using the state variables defined in TABLE I:

mr_autoneg_complete=false.

While the preferred embodiment of the invention is disclosed and described it will be apparent that various modifications may be made without departing from the spirit of the invention or the scope of the subjoined claims.

What is claimed is:

1. A wired Ethernet communication device operable to communicate via a wired Ethernet link with an Ethernet link partner, the wired Ethernet communication device comprising:
   Ethernet transceiver circuitry operable to support communications with the Ethernet link partner at a plurality of rates including a lowest rate and a plurality of higher rates;
   an abilities register operable to store information regarding the plurality of higher rates; and
   auto negotiation circuitry communicatively coupled to the Ethernet transceiver circuitry and to the abilities register, the auto negotiation circuitry operable to:
      access the abilities register to read the information regarding the plurality of higher rates;
      write a supported rates variable with the information regarding the plurality of higher rates read from the abilities register;
      write a qualified supported rates variable with the contents of the supported rates variable;
      access at least one downgrade indication variable;
      when the at least one downgrade indication variable indicates a higher rates downgrade, alter the qualified supported rates variable based upon the downgrade indication variable; and
      perform auto negotiation with the Ethernet link partner based upon the qualified supported rates variable.

2. The wired Ethernet communication device of claim 1, further comprising a host interface communicatively coupled to receive the at least one downgrade indication variable from a coupled host.

3. The wired Ethernet communication device of claim 1, wherein the auto negotiation circuitry is further operable to:
   negotiate a first link rate with the Ethernet link partner, the first link rate being one of the plurality of higher rates;
   fail to establish a link with the Ethernet link partner at the first link rate according to predefined conditions;
   alter the qualified supported rates variable to exclude the first link rate;
   negotiate a second link rate with the Ethernet link partner based upon the qualified supported rates variable, wherein the second link rate is less than the first link rate; and
   attempt to establish a link with the Ethernet link partner at the second link rate.

4. The wired Ethernet communication device of claim 1, wherein the auto negotiation circuitry is further operable to:
   negotiate a first link rate with the Ethernet link partner, the first link rate being one of the plurality of higher rates;
   establish a link with the Ethernet link partner at the first link rate;
   determine that the link at the first link rate has failed;
   again write the qualified supported rates variable with the contents of the supported rates variable;
   again access the at least one downgrade indication variable;
   when the at least one downgrade indication variable indicates a higher rates downgrade, again alter the qualified supported rates variable based upon the downgrade indication variable; and
   again perform auto negotiation with the Ethernet link partner based upon the qualified supported rates variable.

5. The wired Ethernet communication device of claim 1, wherein the at least one downgrade information variable comprises:
   a gigabit mask variable indicating the availability of 1000 BASE-T operations; and
   a one hundred megabit mask variable indicating the availability of 100 BASE-T operations.

6. The wired Ethernet communication device of claim 1, further comprising a host interface communicatively coupled to the auto negotiation circuitry, wherein:
   the host interface is operable to receive information from a coupled host; and
   the auto negotiation circuitry is operable to set the at least one downgrade indication variable based upon the information received via the host interface.

7. The wired Ethernet communication device of claim 1, wherein the abilities register comprises Register 9 as defined in at least the IEEE Std. 802.3, 2000 Edition.

8. The wired Ethernet communication device of claim 7, wherein the abilities register statically stores the information regarding the plurality of higher rates.

9. The wired Ethernet communication device of claim 1, wherein the auto negotiation circuitry is further operable to:
   negotiate a first link rate with the Ethernet link partner, the first link rate being one of the plurality of higher rates;
   fail to establish a link with the Ethernet link partner at the first link rate according to predefined conditions;
   alter the qualified supported rates variable to exclude the first link rate;
   negotiate a second link rate with the Ethernet link partner based upon the qualified supported rates variable, wherein the second link rate is less than the first link rate;
   establish a link with the Ethernet link partner at the second link rate;
   determine that the link at the second link rate has failed;
   again write the qualified supported rates variable with the contents of the supported rates variable;
   again access the at least one downgrade indication variable;
   when the at least one downgrade indication variable indicates a higher rates downgrade, again alter the qualified supported rates variable based upon the downgrade indication variable; and
   again perform auto negotiation with the Ethernet link partner based upon the qualified supported rates variable.

10. The wired Ethernet communication device of claim 1, wherein:
the abilities register comprises Register 9 as defined in at least the IEEE Std. 802.3, 2000 Edition; and
the abilities register statically stores the information regarding the plurality of higher rates.

11. A wired Ethernet communication device operable to communicate via a wired Ethernet link with an Ethernet link partner, the wired Ethernet communication device comprising:
Ethernet transceiver circuitry operable to support communications with the Ethernet link partner at a plurality of rates including a lowest rate and a plurality of higher rates;
an abilities register operable to store information regarding the plurality of higher rates; and
auto negotiation circuitry communicatively coupled to the Ethernet transceiver circuitry and to the abilities register, the auto negotiation circuitry operable to:
access the abilities register to read the information regarding the plurality of higher rates;
write a supported rates variable with the information regarding the plurality of higher rates read from the abilities register;
write a qualified supported rates variable with the contents of the supported rates variable;
access at least one downgrade indication variable;
when the at least one downgrade indication variable indicates a higher rates downgrade, alter the qualified supported rates variable based upon the downgrade indication variable;
perform auto negotiation with the Ethernet link partner based upon the qualified supported rates variable;
negotiate a first link rate with the Ethernet link partner, the first link rate being one of the plurality of higher rates;
fail to establish a link with the Ethernet link partner at the first link rate after a predetermined number of attempts to establish the link at the first link rate;
alter the qualified supported rates variable to exclude the first link rate;
negotiate a second link rate with the Ethernet link partner based upon the qualified supported rates variable, wherein the second link rate is less than the first link rate; and
attempt to establish a link with the Ethernet link partner at the second link rate.

12. The wired Ethernet communication device of claim 11, further comprising a host interface communicatively coupled to receive the at least one downgrade indication variable from a coupled host.

13. The wired Ethernet communication device of claim 11, wherein the auto negotiation circuitry is further operable to:
negotiate a first link rate with the Ethernet link partner, the first link rate being one of the plurality of higher rates;
establish a link with the Ethernet link partner at the first link rate;
determine that the link at the first link rate has failed;
again write the qualified supported rates variable with the contents of the supported rates variable;
again access the at least one downgrade indication variable;
when the at least one downgrade indication variable indicates a higher rates downgrade, again alter the qualified supported rates variable based upon the downgrade indication variable; and
again perform auto negotiation with the Ethernet link partner based upon the qualified supported rates variable.

14. The wired Ethernet communication device of claim 11, wherein the at least one downgrade information variable comprises:
a gigabit mask variable indicating the availability of 1000 BASE-T operations; and
a one hundred megabit mask variable indicating the availability of 100 BASE-T operations.

15. The wired Ethernet communication device of claim 11, further comprising a host interface communicatively coupled to the auto negotiation circuitry, wherein:
the host interface is operable to receive information from a coupled host; and
the auto negotiation circuitry is operable to set the at least one downgrade indication variable based upon the information received via the host interface.

16. The wired Ethernet communication device of claim 11, wherein the abilities register comprises Register 9 as defined in at least the IEEE Std. 802.3, 2000 Edition.

17. A wired Ethernet communication device operable to communicate via a wired Ethernet link with an Ethernet link partner, the wired Ethernet communication device comprising:
Ethernet transceiver circuitry operable to support communications with the Ethernet link partner at a plurality of rates including a lowest rate and a plurality of higher rates;
an abilities register operable to store information regarding the plurality of higher rates; and
auto negotiation circuitry communicatively coupled to the Ethernet transceiver circuitry and to the abilities register, the auto negotiation circuitry operable to:
access the abilities register to read the information regarding the plurality of higher rates;
write a supported rates variable with the information regarding the plurality of higher rates read from the abilities register;
write a qualified supported rates variable with the contents of the supported rates variable;
access at least one downgrade indication variable;
when the at least one downgrade indication variable indicates a higher rates downgrade, alter the qualified supported rates variable based upon the downgrade indication variable;
perform auto negotiation with the Ethernet link partner based upon the qualified supported rates variable;
negotiate a first link rate with the Ethernet link partner, the first link rate being one of the plurality of higher rates;
fail to establish a link with the Ethernet link partner at the first link rate according to predefined conditions;
alter the qualified supported rates variable to exclude the first link rate;
negotiate a second link rate with the Ethernet link partner based upon the qualified supported rates variable, wherein the second link rate is less than the first link rate;
establish a link with the Ethernet link partner at the second link rate;
determine that the link at the second link rate has failed;
again write the qualified supported rates variable with the contents of the supported rates variable;
again access the at least one downgrade indication variable;
when the at least one downgrade indication variable indicates a higher rates downgrade, again alter the qualified supported rates variable based upon the downgrade indication variable; and again perform auto negotiation with the Ethernet link partner based upon the qualified supported rates variable.

18. The wired Ethernet communication device of claim 17, further comprising a host interface communicatively coupled to receive the at least one downgrade indication variable from a coupled host.

19. The wired Ethernet communication device of claim 17, wherein the at least one downgrade information variable comprises:

a gigabit mask variable indicating the availability of 1000 BASE-T operations; and a one hundred megabit mask variable indicating the availability of 100 BASE-T operations.

20. The wired Ethernet communication device of claim 17, further comprising a host interface communicatively coupled to the auto negotiation circuitry, wherein:

the host interface is operable to receive information from a coupled host; and the auto negotiation circuitry is operable to set the at least one downgrade indication variable based upon the information received via the host interface.

* * * * *